United States Patent
Laksono et al.

(10) Patent No.: US 6,297,852 B1
(45) Date of Patent: Oct. 2, 2001

(54) VIDEO DISPLAY METHOD AND APPARATUS WITH SYNCHRONIZED VIDEO PLAYBACK AND WEIGHTED FRAME CREATION

(75) Inventors: Indra Laksono, Richmond Hill; Raymond M. Li, Markham, both of (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/223,606

(22) Filed: Dec. 30, 1998

(51) Int. Cl.$^7$ ............................... H04N 9/74; H04N 5/04
(52) U.S. Cl. ........................ 348/584; 348/500; 348/589
(58) Field of Search ................................. 348/584, 589, 348/597, 500; H04N 9/74, 5/04

(56) References Cited

U.S. PATENT DOCUMENTS 6,005,584 * 12/1999 Kitamura ............................... 345/430

* cited by examiner

Primary Examiner—Sherrie Hsia
(74) Attorney, Agent, or Firm—Vedder, Price, Kaufman & Kammholz (57) ABSTRACT

A video display apparatus and method for displaying decoded video frames from an encoded video stream utilizes a display time difference determinator that detects a frame display time difference, on a per frame basis if desired, between a refresh rate based frame display time, and a video playback frame rate display time to generate frame display time difference data. This is done on a continuous basis to detect synchronization problems between video data that is to be displayed simultaneously with non-video data on a display device such as a progressive display screen. A pixel blender blends pixel data from an adjacent frame, such as an already reconstructed previous frame or next frame, to create a temporally adjusted frame based on the determined frame display time difference data.

29 Claims, 6 Drawing Sheets

VIDEO DISPLAY METHOD AND APPARATUS WITH SYNCHRONIZED VIDEO PLAYBACK AND WEIGHTED FRAME CREATION

FIELD OF THE INVENTION

The invention relates generally to video display devices for displaying decoded video and more particularly to video display systems for synchronizing decoded video on progressive screens.

BACKGROUND OF THE INVENTION

Multimedia systems, such as multimedia computer systems are incorporating video display capabilities in conjunction with graphics display capabilities to allow users to display, for example, windows of a video within a window displaying graphic information. For example, a user of a computer having a progressive display may, for example, have a movie playing in one window while editing a document or performing some other function through another software application in another window within a computer screen.

A commonly known digital format for encoding digital video is the MPEG type standard developed by Philips Electronics Corporation. Graphics controller chips are known that may interface with an MPEG encoder or decoder and store video information in a frame buffer for display in combination with text data also stored in the frame buffer. Digital video motion compensation chips are also known which apply MPEG type standard motion compensation to minimize the amount of information that needs to be processed. For example, one frame may be broken into many macro blocks and portions of that frame may be used, for example, to reconstruct video frame for a subsequent or previous frame so that the entire frame need not be encoded. Motion vectors embedded in compressed video streams may be used, for example, to indicate how to combine various pixel blocks from differing frames for subsequent or previous frames to allow the system to provide visual motion. However, a problem arises if the display screen refresh rate, such as a progressive display screen refresh rate, is different from a video playback rate. Stored video may have a slower (or faster) playback rate. Video may be stored on a digital video disc or may come from some other source. One method of overcoming this problem involves repeatedly showing a same frame over. However, this can be perceived as unsmooth motion or jerky motion known as judder. This problem is compounded when video is to be displayed in one area and text is to be displayed in another area because the video display system typically must use a lower frame rate for text. For example, MPEG may encode video at varying frame rates per second including, for example, 30, 24, or 60 frames per second, whereas such refresh rates may be 85 cycles per second.

As previously mentioned, motion compensation estimation techniques are known that attempt to predict where an object will be based, based on a previous frame and future frame data and the system attempts to generate a new frame in real time. A problem with this motion estimation approach is that it is computationally intensive and can be burdensome to a host processing unit or graphics controller. In addition, processing time is a limited resource since additional functionality is being continually added to multimedia systems. In such systems, it is also known to use programmable blending factors for generating constructed macroblocks based on motion vector predicted reference frames to generate standard frames from encoded frame data in the input stream. However, such systems do not generally generate new frames that were not originally encoded in the input stream.

Consequently, there exists a need for a video display system and method that can continuously synchronize video playback and non-video display data having different display rates to improve the appearance of motion video in an attempt to avoid judder. It would be desirable if such a system took advantage of constructed frames based on motion compensation to generate new frames, while improving video playback quality.

DETAILED DESCRIPTION OF A PREFERRED EMBODIMENT OF THE INVENTION

The disclosed system and method provides dynamic display synchronization between video data in a first display window and other data in another display window. Briefly, a video display apparatus and method for displaying decoded video frames from an encoded video stream utilizes a display time difference determinator that detects a frame display time difference, on a per frame basis if desired, between a refresh rate based frame display time, and a video playback frame rate display time to generate frame display time difference data. This is done on a continuous basis to detect synchronization problems between video data that is to be displayed simultaneously with non-video data on a display device such as a progressive display screen. A pixel blender blends pixel data from an adjacent fame, such as an already reconstructed previous frame or next frame, to create a temporally adjusted frame based on the determined frame display time difference data. To determine the amount of blending from the adjacent frame, in one embodiment, the system employs a weighting factor generator that generates a frame difference temporal weight factor based on the time difference so that if a larger time difference occurs between a desired current and next frame, more of the current frame pixel data will be used to crease the desired frame whereas if a previous frame is closer to the desired current frame, more of the adjacent frame pixel data will be used during the blending operation. As such, the apparatus may operate as a type of motion blur filter so that each frame that is not synchronized with the screen refresh frame rate may be constructed from reconstructed frames in the instance where the encoded video stream utilizes embedded motion compensation data.

In one embodiment, a previous frame reader and a next frame reader, each containing reconstructed frames where present, are used as the source of the adjacent frame information that is used during blending. Video playback frame display time stamp data is used to determine timing for a closest playback frame for use in determining the frame display time difference data. The frame buffer receives the temporally adjusted video frame data along with non-video data to facilitate combined display of video frame data with non-video data such as graphic data or other data on a common display device.

Figure 1:
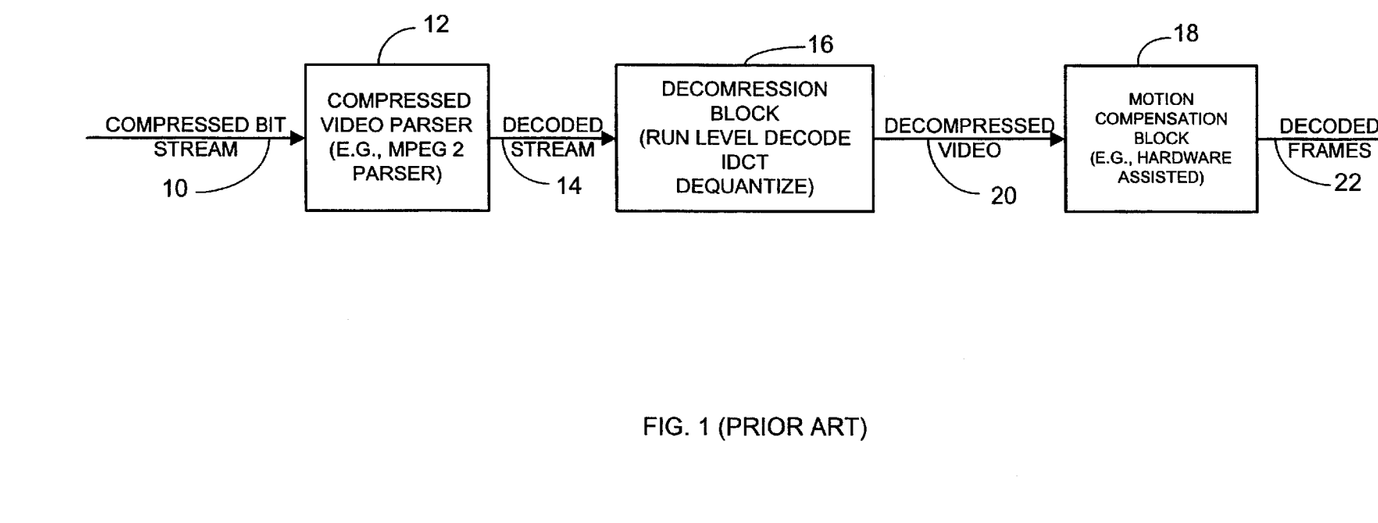
FIG. 1 is a block diagram depicting a digital video decompression and motion compensation system, as known in the art.

FIG. 1 shows an example of a prior art digital video decoder such as may be used for example where the encoded video stream has been encoded according to an MPEG format. As shown, digital video decompression occurs by passing a compressed bit stream 10 to a bit stream parser 12. The bit stream parser 12, as known in the art, decodes the compressed bit stream and outputs partially decoded information 14 to a decompression block 16 that performs such operations as DeHuffman decoding, run level decoding, IDCT and dequantization. A motion compensation block 18 receives decompressed video data 20 and performs motion compensation to reconstruct video frames using motion vectors as known in the art. This may be performed through the use of a combination of hardware and software resulting in reconstructed video frame data 22. The resulting reconstructed video frames are then typically repeatedly displayed several times to accommodate for the asynchronous timing of the frames caused by the difference between the video playback rate and the screen refresh rate.

Figure 2:
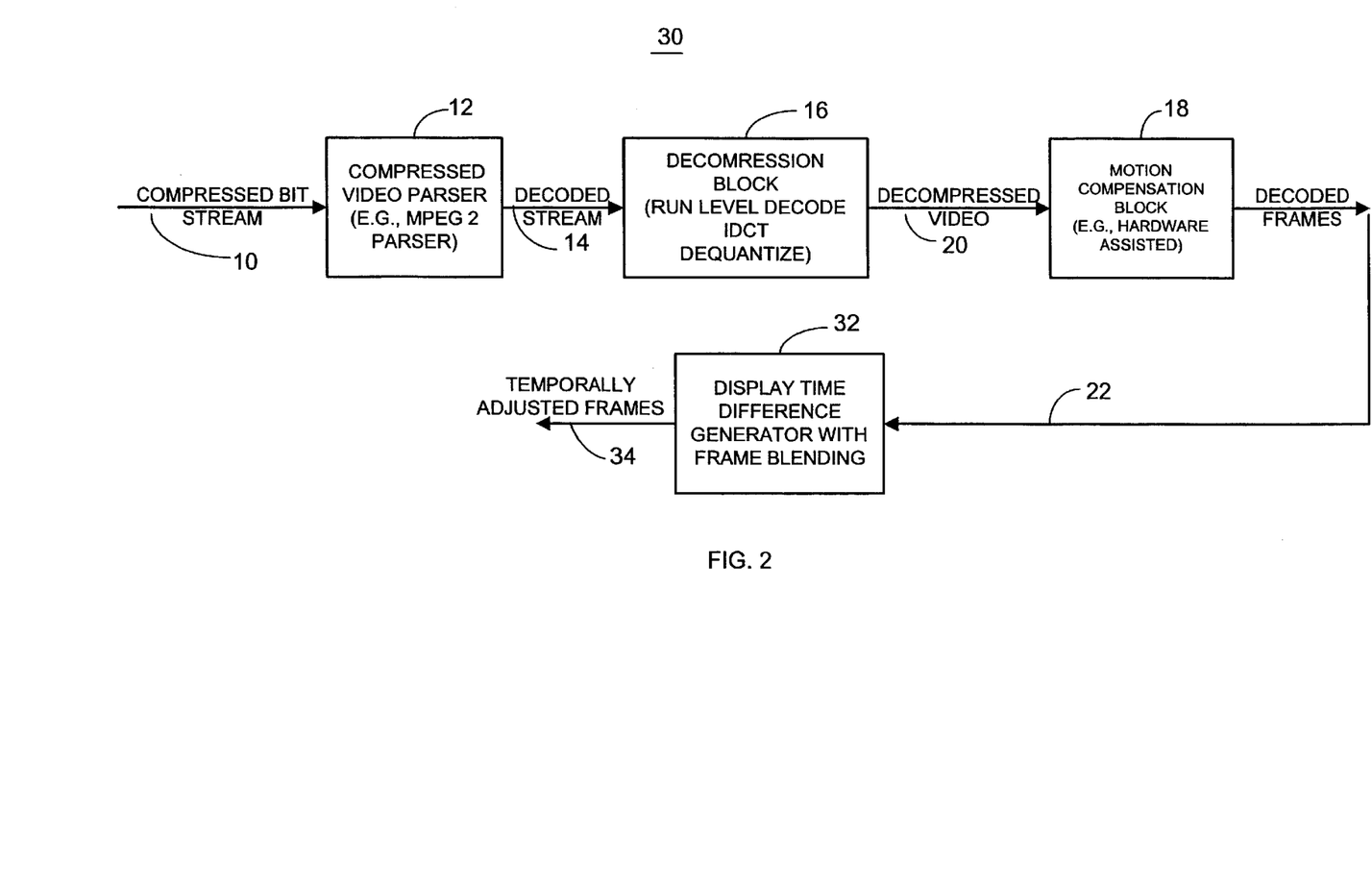
FIG. 2 is a block diagram depicting a video display device for displaying decoded video frames from an encoded video stream in accordance with one embodiment of the invention.

FIG. 2 shows a video processing apparatus 30 that includes a frame rate converter that facilitates frame synchronization in accordance with one embodiment of the invention. A display time difference generator with frame blending block 32 provides temporally adjusted video frames 34 for simultaneous display with non-video information on a display screen. The temporally adjusted frames are synchronized with the screen refresh rate and include a blending of pixel data from an adjacent frame to smooth out motion so that improved display motion video is output.

Figure 3:
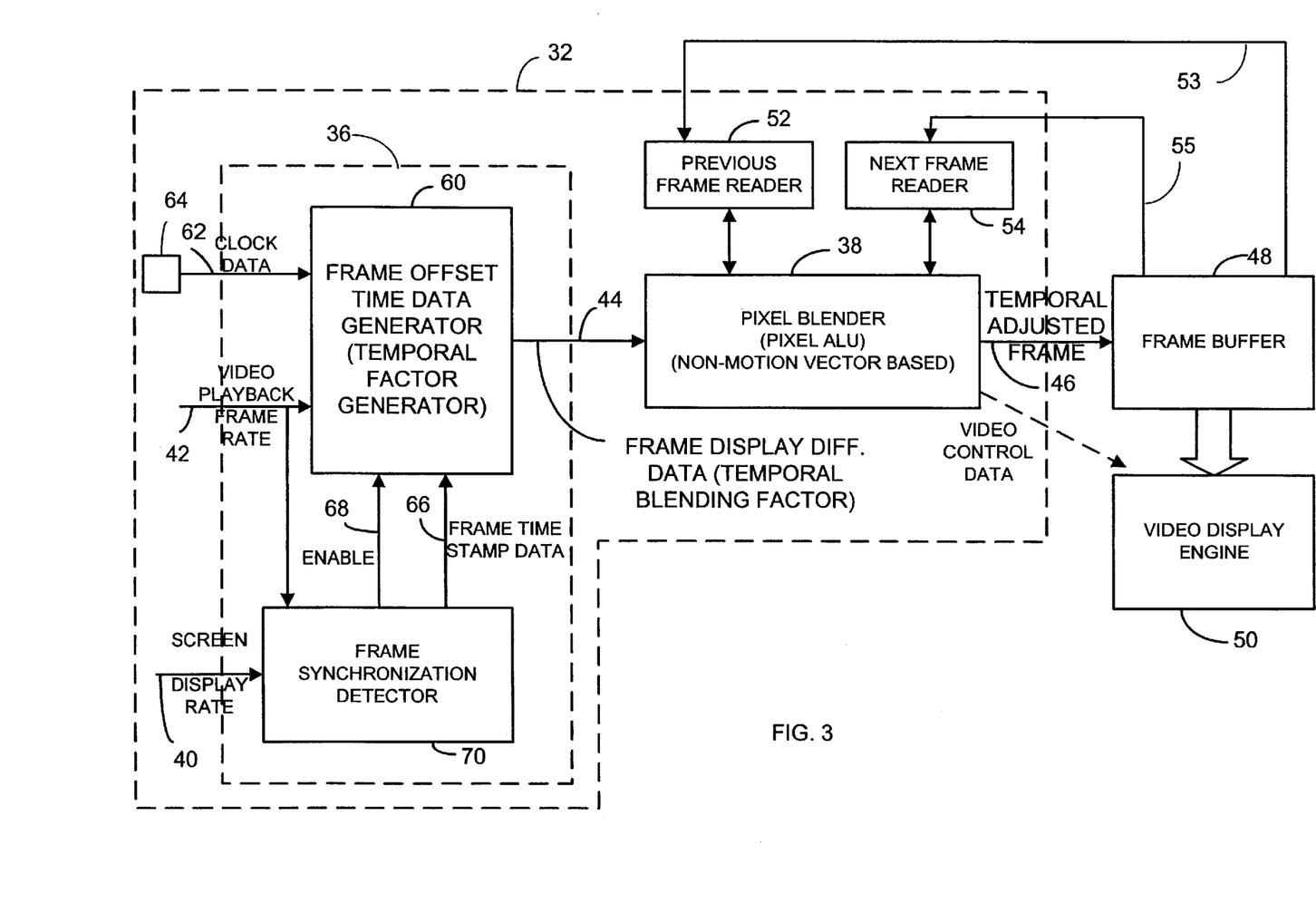
FIG. 3 is a block diagram depicting a video display device for displaying decoded video frames from an encoded video stream in accordance with one embodiment of the invention.

FIG. 3 shows in more detail the display time difference generator with frame blending block 32 of FIG. 2. The display time difference generator with frame blending 32 includes a display time difference determinator 36 and a pixel blender 38 serving as a frame blender. The display time difference determinator 36 detects a frame display time difference, for example on a per frame basis, between a refresh rate based frame display time represented, for example, by screen display rate data 40, and video playback frame rate display time, represented, for example, as video playback frame rate data 42, to generate frame display time difference data 44. The temporally adjusted frame 46 is output to a frame buffer 48 which is then accessed by a video display engine 50, as known in the art, which outputs the temporally adjusted video frame with non-video data simultaneously on a display such as a progressive display screen. The frame buffer 48 may also be system memory or other memory, if desired. The display time difference generator with frame blending 32 may be implemented in hardware using any suitable processing unit and/or discrete logic or it may be implemented software, if desired, by controlling a programmable processing unit, such as a microprocessor. The pixel blender 38 may be a pixel arithmetic logic unit (ALU).

A previous frame reader 52 and a next frame reader 54 are operatively coupled to the pixel blender 38 wherein the pixel blender 38 creates the temporally adjusted frame 46 based on frame data obtained from at least one of the previous frame reader 52 and the next frame reader 54 in an amount based on the player display time difference data 44. The frame readers 52 and 54 may output pixel data in Y,U,V format or in any datable format. The previous frame reader 52 and the next frame reader 54 receive corresponding frame data 53 and 55 from the frame buffer. The frame data contained in the previous frame reader 52 and the next frame reader 54 is reconstructed frame data that has been reconstructed by a motion compensation block or other suitable generation based on motion compensation data, such as motion vectors in the instance where the device is employed to synchronize MPEG encoded video. However, it will be recognized that non-reconstructed frame data may also be used, such as in the case where the information is a picture frame or index frame or other complete frame that has not been reconstructed from motion compensation data. As such, the pixel blender 38 retrieves an entire previous frame and/or next frame from the respective frame readers 52 and 54 based on timing offset data in the form, for example, of the display time difference data 44. Where a current frame to be synchronized with the refresh rate is closer in time to the previous frame, more of the previous frame data is obtained to create the current frame. Alternatively, where the current video frame to be synchronized with the refresh rate frame is closer in time to a next frame video frame that would be normally displayed based on the playback frame rate, the foame data from the next frame reader 54 would be primarily used to create the current frame.

The display time difference generator 36 also includes a frame offset time data generator 60 that receives a clock input signal 62 from a clock source 64, the video playback frame rate data 42 along with video playback frame display times tamp data 66 and may be controlled by an enable signal 68 from a frame synchronization detector 70. The display time difference determinator 36 receives video playback frame display time stamp data to determine timing for a closest playback frame for use in determining the frame display time difference data. As such, the time stamp data is us ed to determine which frame is closest to a frame needed to be synchronically displayed with the screen refresh rate. The video playback frame display time stamp data 66 may be obtained from the encoded stream corresponding to each frame of video that must be displayed. A time stamp is stored for a previous playback frame in a next playback frame. Preferably, four or five consecutive frames are stored so that a time stamp for each of the stored frames is input to the frame display time difference data generator 60. The frame synchronization detector 70 receives the video playback frame rate data 42 and the screen display refresh rate data 40 to determine whether a timing difference is present between a playback frame and a frame display time based on the screen refresh rate, on a frame-by-frame basis. The enable signal 68 is generated when a difference is detected between the video playback frame rate and the screen display frame rate for a given playback frame indicating that synchronization must occur. This is done on a continuous basis to provide dynamic display synchronization between video data for display in a first display space, such as a window, and other non-video data, for example, graphics data for simultaneous display in another display space, such as another window on the display screen.

Figure 4A:
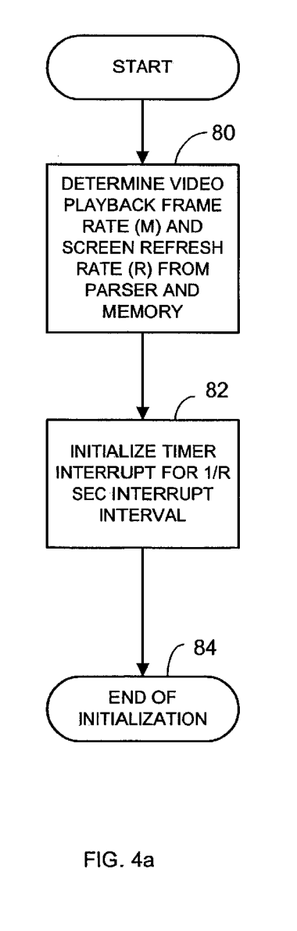
FIGS. 4a and 4b are flow charts illustrating one example of the operation of the video display device shown in FIG. 3.
Figure 5:
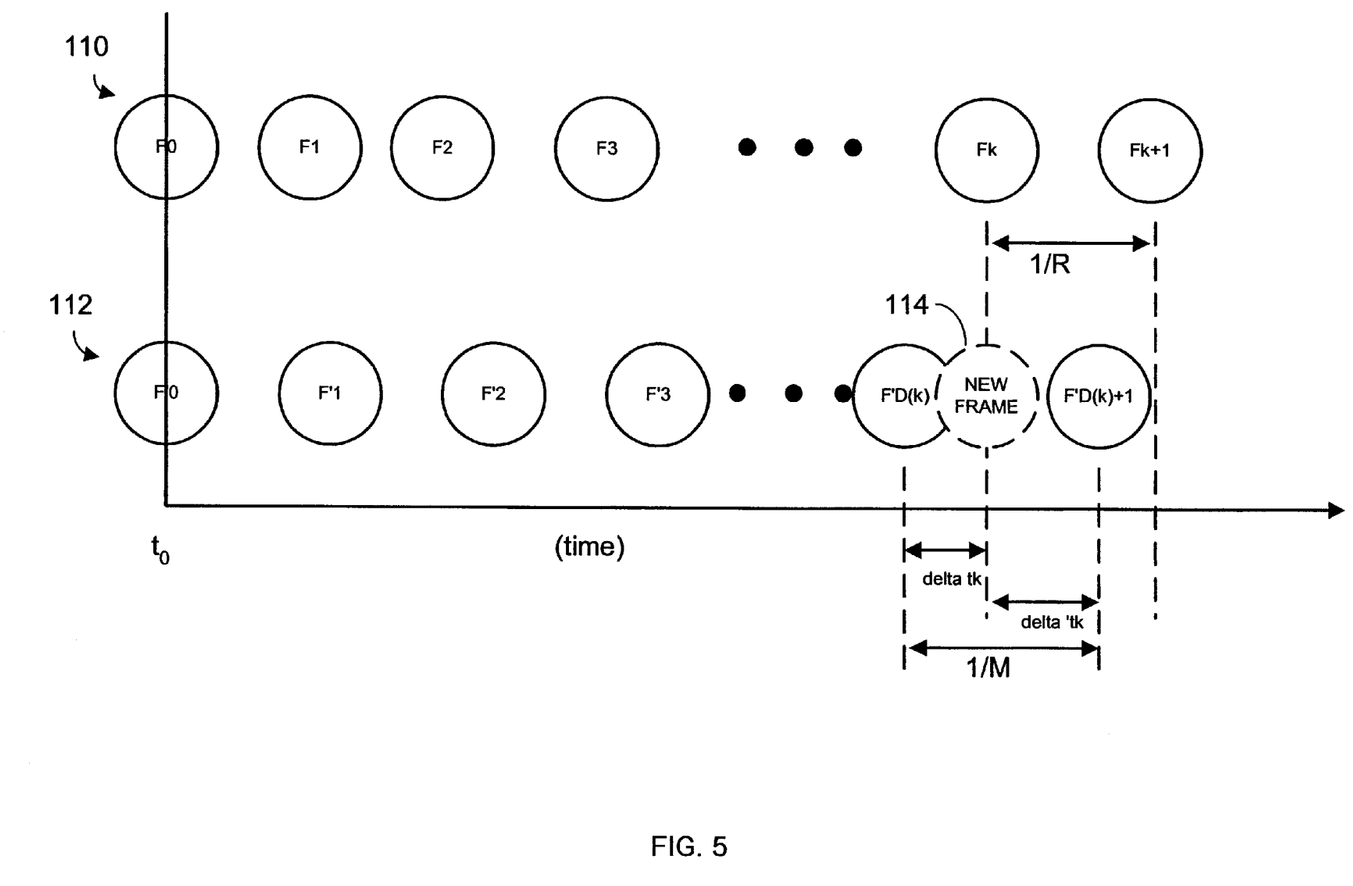
FIG. 5 is a graphic illustration of display frame offset incompatibility.

Referring to FIGS. 3–5, one example of the operation of the apparatus 30 will now be described. As shown in FIG. 4a the system obtains initial information. As shown in block 80, the system upon power up or reset, determines video playback frame rate data (M) from a decoding parser and screen refresh rate data (t) from memory storing the screen refresh rate, or in other suitable ways. An internal timer interrupt is set to be equal to for 1/R seconds which then serves as the interrupt interval as shown in block 82. The initialization is then complete as shown in block 84.

Figure 4B:
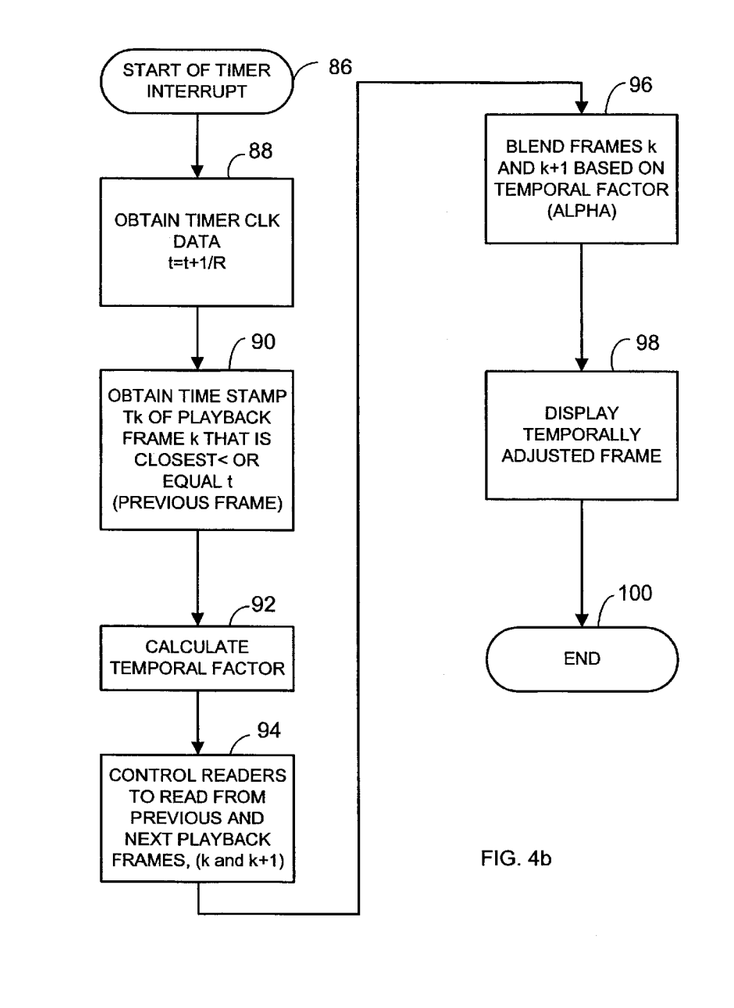

At the start of the timer interrupt as shown in block 86 of FIG. 4b, the frame display time difference data generator 60 obtains the timer clock data 62 represented as (t) such that t=t+1/R. This is shown in block 88. As shown in block 90, the apparatus obtains video playback frame display time stamp data ($t_k$) of a playback frame (k) that is closest to the previous playback fame, e.g., less than or equal to (t). This is used to determine timing for a closest playback frame for use in determining frame display time difference data. As shown in block 92, the frame display time difference data 44 ($\alpha$) is then calculated according to the following formula:

$$\alpha = \Delta t_k * M$$

where $\Delta t_k$ represents a time difference between the time a frame of data is displayed based on the refresh rate and the time of a display of a video form based on the video playback rate, and M equals the native display rate of the video stream (See, e.g., FIG. 5). The weighting factor $\alpha$ is used to determine the amount of blending between the closest frame and a current frame to be displayed.

As shown in block 94, the system through the frame blender controls the previous frame reader and the next frame reader to read other reconstructed frame data, original frame, or other frame associated with a playback frame (k) and then frame (k+1). The system then blends frames (k) and (k+1) based on the frame display difference data as shown in block 96 to build a new frame. This is done according to the following formula:

$$Fk = (1-\alpha) * F'_{D[k]} + \alpha * F'_{D[k]+1}$$

where ($F'_{Dk}$) is, for example, a frame of MPEG video to be displayed at a time t'D[k] where t'D[k]=D(k)/M where M=the required video playback rate (e.g., the native display rate of a video stream). As shown in block 98, a display engine then displays the temporally adjusted frame that was stored in the frame buffer and the process continues when the next frame is shown, represented by block 100. It will be recognised that other formulas can be used to producer Fk. In general, nonlinear functions can be used, for example, $$Fk = v(F_{D[k]}, \alpha) + \omega(F_{D[k]+1}, \alpha)$$

where v and $\omega$ are blending functions to be applied to the frames, such as MPEG frames.

As such, the system detects a frame display time difference on a per frame basis between a refresh rate based frame display time and a video playback frame rate display time to generate frame display time difference data for dynamic display synchronization between video data for display in a first display spacer sort window and other data for simultaneous display in another display space or window. The method includes, for example, generating frame display time difference data based on a clock source video playback rate frame rate data and video playback frame display time stamped data. The method also includes detecting video playback frame rate and screen display frame fate difference data based on video playback frame rate data and screen display refresh rate data. A method then includes blending pixel data or frame data from an adjacent reconstructed frame or fill frame to create a temporally adjusted frame based on the determined frame display time difference data. Where the frame display time difference data is represented as a temporal weight factor, the method includes generating a frame difference temporal weight factor (e.g., alpha) based on the determined frame display time difference. The system may use an index frame in the case of an MPEG based encoded stream to determine the frame display time difference since the index frame represents the frame from which other frames are constructed. It will be recognized that any other suitable frames may also be used including nonconstructed frames, if desired.

The system may be, for example, used with a computer system where screen refresh rates may be 75 Hertz, 85 Hertz or higher. MPEG-2 video is usually recorded at twenty-four, thirty frames per second or sixty frames per second. As such, the disclosed system attempts to remove the judder by providing a dynamic detection of nonsynchronized video playback frames and then when necessary, builds a new video frame based on adjacent video frames.

FIG. 5 graphically illustrates a timing difference and associated intervals used in determining a display time difference data, as well as determining asynchronous display frames. As shown, a series of frames $F_0$ through $F_{(k+1)}$ generally indicated by arrow 110 represents frames displayed at the screen refresh rate such as non-video data or other video data to be displayed at a different rate including, for example, graphics data, text data or other data. Frames $F'_0$ through $F'_{D[k]+1}$ represented by arrow 112 represent the playback video frames. As shown, frame $F'_{D[k]}$ is not synchronized with the frame F(k). As such, a new video playback fame to be displayed at the time that the frame F(k) is to be displayed is created by the system The frame created is represented by dashed circle 114.

Figure 6:
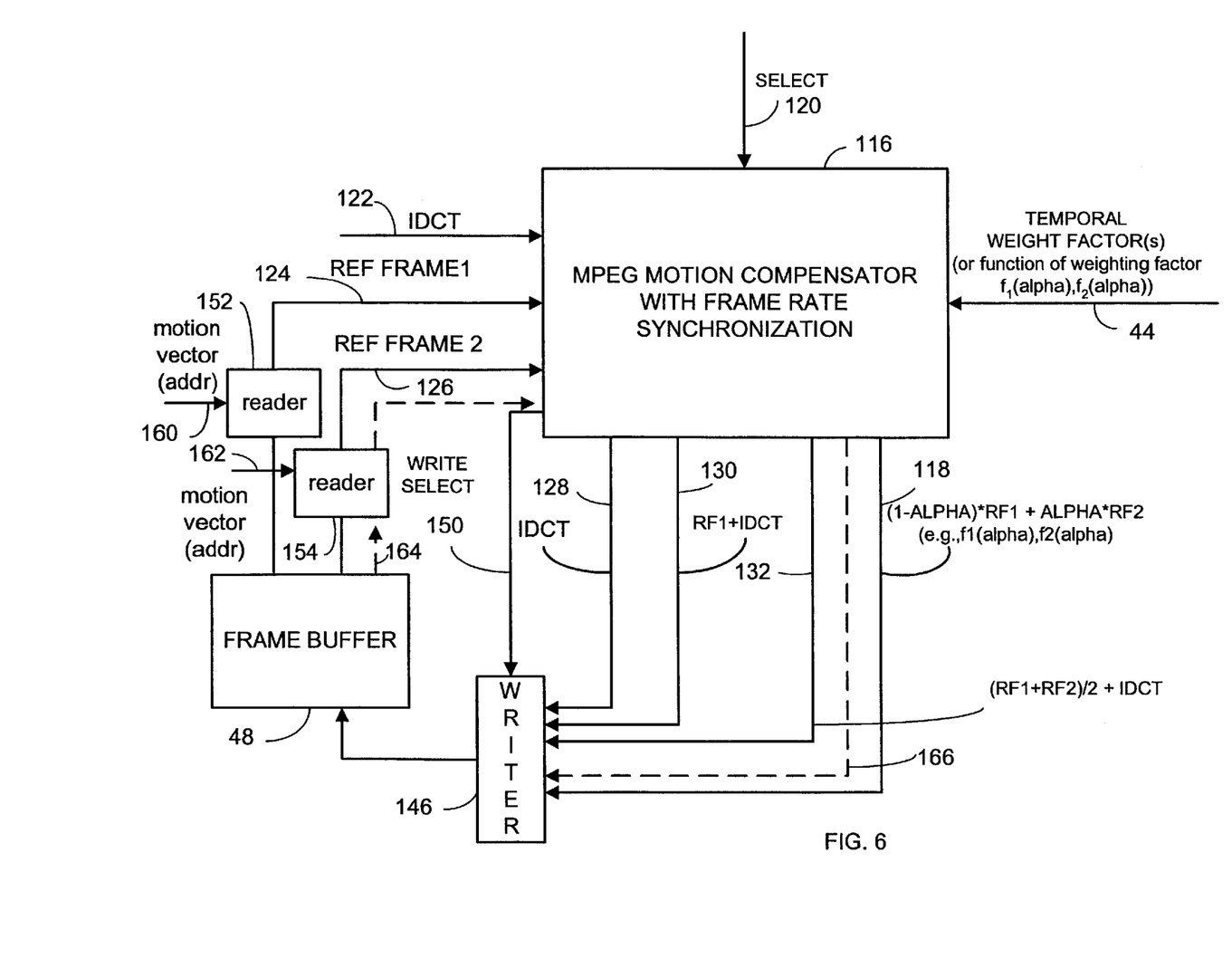
FIG. 6 is a block diagram illustrating a motion compensation block with the addition of a display time difference determination mechanism in accordance with one embodiment of the invention.

FIG. 6 shows an MPEG motion compensator with frame rate synchronization 116 in accordance with the invention which may be, for example, a combination of hardware and software that facilitates both conventional MPEG type motion compensation based on motion vectors, and additionally frame rate synchronization and the output of blending ratios or other suitable blending definition data 118 to be used by a pixel blender. The select line 120, 1 as known in the art, allows a controller to select which of the inputs IDCT 122, reference frame 124 or reference frame 126 to output IDCT data 128, reference frame+IDCT data 130 or using the combination of the reference frame data 124 and 126 to output data 132. The frame readers 152 and 154 receive the motion vector data 160 and 162, such as address data to construct macroblocks based on the motion vector data, as known in the art. This data is used in a conventional way to construct frames F'[k] and F'[k+1 ].

In contrast with conventional systems, in another pass, the system then constructs new frame Fk. This is done by reusing read path 164 and write path 166 (indicated in dashed lines) along with readers and writers 152, 154 and 146 to read already motion compensated reference frames 124 (e.g., F'[k]) and 126 (e.g., F'[k+1]). The select line 120 is also reused to select the temporal weight factor and output the new frame data 118. In addition, ALU functions are reused, such as adders and/or multipliers depending on the blending function selected. An additional multiplier stage may be necessary if the previous motion compensation engine only performed addition functions to generate data 128, 130 and 132. Hence the motion compensation ALU functions are leveraged, particularly when a front end scaler is used as part of MPEG motion compensation. Additional multipliers and adders may need to be added depending upon the blending function used. Accordingly, motion compensation functions are reused including ALU functions, select control functions, read paths and write paths.

The modified motion compensation block 116 receives the temporal weighting factor 44 as input. In this mode, the select line 120 causes the write select line 150 going to the writer 146 to write data 118 (such as a portion of a new frame-e.g., macroblocks). The writer in this mode writes F'D[k]=(1-alpha) RF1 and F'D[k+1] RF2 to the frame buffer. The motion compensator with frame rate synchronization 116 generates temporally adjusted video and graphics data after prediction information has been applied to frame data. The reuse of the motion compensation operations affords savings in terms of circuitry and/or memory costs.

It should be understood that the implementation of other variations and modifications of the invention in its various aspects will be apparent to those of ordinary skill in the art, and that the invention is not limited by the specific embodiments described. For example, the blending formulas described herein are but one example, any suitable linear or nonlinear blending or combining may be used. Also, if a front end scaler is used as a motion compensation engine, the additional multipliers or other logic to generate the data 118 may not be required provided the front end scaler has excess capacity to timely output the newly constructed frame. It is therefore contemplated to cover by the present invention, any and all modifications, variations, or equivalents that fall within the spirit and scope of the basic underlying principles disclosed and claimed herein.

What is claimed is:

1. A video display apparatus for displaying decoded video frames from an encoded video stream comprising:
   a display time difference determinator that detects a frame display time difference between a refresh rate based frame display time and a video playback frame rate display time to generate frame display time difference data; and
   a pixel blender that blends pixel data from an adjacent frame to create a temporally adjusted frame based on the determined frame display time difference data.

2. The apparatus of claim 1 wherein the display time difference determinator includes a weighting factor generator that generates the frame display time difference data as a frame difference temporal weight factor based on the determined frame display time difference.

3. The apparatus of claim 1 wherein the frame display time difference is based on index (I) frame detection in the encoded video stream.

4. The apparatus of claim 1 including a previous frame reader and a next frame reader operatively coupled to the pixel blender wherein the pixel blender creates the temporally adjusted frame based on frame data obtained from at least one of the previous frame reader and the next frame reader in an amount based on the frame display time difference data.

5. The apparatus of claim 4 wherein frame data obtained from the previous frame reader and the next frame reader include reconstructed frame data that has been reconstructed based on motion compensation data in an encoded video frame.

6. The apparatus of claim 1 wherein the display time difference determinator is operatively responsive to video playback frame display time stamp data to determine timing for a closest playback frame for use in determining the frame display time difference data.

7. The apparatus of claim 1 including a frame buffer operatively coupled to receive the temporally adjusted video frame and graphics data to facilitate combined display of video frame data with graphic data on a common display device.

8. The apparatus of claim 5 wherein the encoded video stream is encoded at least in part in an MPEG format.

9. A video display apparatus for displaying decoded video frames from an encoded video stream comprising:
   a display time difference determinator that detects a frame display time difference between a refresh rate based frame display time and a video playback frame rate display time to generate frame display time difference data for dynamic display synchronization between video data for display in a first display space and other data for simultaneous display in another display space including:
      a frame offset time data generator responsive to a clock source, video playback frame rate data and video playback frame display time stamp data that generates the frame display time difference data, and
      a video playback frame rate detector operatively responsive to video playback frame rate data and screen display refresh rate data; and
   a pixel blender that blends pixel data from an adjacent reconstructed frame to create a temporally adjusted frame based on the determined frame display time difference data.

10. The apparatus of claim 9 wherein the display time difference determinator includes a weighting factor generator that generates the frame display time difference data as a frame difference temporal weight factor based on the determined frame display time difference.

11. The apparatus of claim 9 wherein the fame display time difference is based on index (I) frame detection in the encoded video stream.

12. The apparatus of claim 9 including a previous frame reader and a next frame reader operatively coupled to the pixel blender wherein the pixel blender creates the temporally adjusted frame based on frame data obtained from each of the previous frame reader and the next frame reader in an amount as a function of the frame display time difference data.

13. The apparatus of claim 12 including a frame buffer operatively coupled to receive the temporally adjusted video frame and graphics data to facilitate combined display of video frame data with graphic data on a common display device.

14. The apparatus of claim 13 wherein the encoded video stream is encoded at least in part in an MPEG format.

15. A video display method for displaying decoded video frames from an encoded video stream comprising the steps of:
   detecting a frame display time difference between a refresh rate based frame display time used to display non-video data and a video playback frame rate display time to display video, to generate frame display time difference data; and
   blending pixel data from an adjacent frame to create a temporally adjusted frame based on the determined frame display time difference data.

16. The method of claim 15 including generating the frame display time difference data as a frame difference temporal weight actor based on the determined frame display time difference.

17. The method of claim 15 including determining the frame display time difference based on index (I) frame detection in the encoded video stream.

18. The method of claim 15 including the step of creating the temporally adjusted frame based on frame data obtained from each of a previous frame reader and a next frame reader in an amount based on the frame display time difference data.

19. The method of claim 18 wherein frame data obtained from the previous frame reader and the next frame reader includes reconstructed frame data that has been reconstructed base do motion compensation data in an encoded video frame.

20. The method of claim 19 wherein the encoded video stream is encoded at least in part in an MPEG format.

21. The method of claim 15 including obtaining video playback frame display time stamp data to determine timing for a closest playback frame for use in determining the frame display time difference data.

22. The method of claim 15 including receiving, by a frame buffer, temporally adjusted video frame and graphics data to facilitate combined display of video frame data with non-video data on a common display device.

23. The method of claim 15 including the step of reusing motion compensation functions including at least one of ALU functions and select control functions to generate temporally adjusted video and graphics data after prediction information has been applied to frame data.

24. A video display method for displaying decoded video frames from an encoded video stream comprising the steps of:

detecting a frame display time difference between a refresh rate based frame display time and a video playback frame rate display time to generate frame display time difference data for dynamic display synchronization between video data for display in a first display space and other data for simultaneous display in another display space including:

generating the frame display time difference data based on a clock source, video playback frame rate data and video playback frame display time stamp data, and     detecting video playback frame rate and screen display frame rate difference data based on video playback frame rate data and screen display refresh rate data; and     blending pixel data from an adjacent reconstructed frame to create a temporally adjusted frame based on the determined frame display time difference data.

25. The method of claim 24 including generating the frame display time difference data as a frame difference temporal weight factor based on the determined frame display time difference.

26. The method of claim 24 including determining the frame display time difference based on index (I) frame detection in the encoded video stream.

27. The method of claim 24 including the step of creating the temporally adjusted frame based on frame data obtained from each of a previous frame reader and a next frame reader in an amount based on the frame display time difference data.

28. The method of claim 27 wherein frame data obtained from the previous frame reader and the next frame reader includes reconstructed frame data that has been reconstructed based on motion compensation data in an encoded video frame.

29. The method of claim 24 including obtaining video playback frame display time stamp data to determine timing for a closest playback frame for use in determining the frame display time difference data.

\* \* \* \* \*